US007328866B2

(12) United States Patent
 Torres Aso

(10) Patent No.: US 7,328,866 B2
(45) Date of Patent: Feb. 12, 2008

(54) DOUBLE BOTTOM TANK AND MIXING AUGER FOR CHOPPING ANIMAL FEED

(75) Inventor: Fernando Torres Aso, Monzon (ES)

(73) Assignee: Grupo Tatoma, S.L., Monzon (ES)

( * ) Notice: Subject to any disclaimer, the term of this patent is extended or adjusted under 35 U.S.C. 154(b) by 115 days.

(21) Appl. No.: 10/509,458

(22) PCT Filed: Apr. 1, 2003

(86) PCT No.: PCT/ES03/00148

§ 371 (c)(1),
(2), (4) Date: May 23, 2005

(87) PCT Pub. No.: WO03/081994

PCT Pub. Date: Oct. 9, 2003

(65) Prior Publication Data

US 2005/0242222 A1    Nov. 3, 2005

(30) Foreign Application Priority Data

Apr. 1, 2002    (ES) ............................... 200200750

(51) Int. Cl.
*B02B 3/06*    (2006.01)
*B02C 19/22*   (2006.01)

(52) U.S. Cl. .................................................. 241/260.1

(58) Field of Classification Search .............. 241/260.1
See application file for complete search history.

(56) References Cited

U.S. PATENT DOCUMENTS

| 3,102,694 | A | * | 9/1963 | Frenkel ...................... 241/251 |
| 3,865,319 | A | * | 2/1975 | Hoffman ................... 241/188.1 |
| 5,439,182 | A | * | 8/1995 | Sgariboldi ................ 241/260.1 |
| 5,791,572 | A | * | 8/1998 | Fernlund .................. 241/206.1 |
| 5,975,449 | A | * | 11/1999 | Geyer ....................... 241/260.1 |
| 2001/0038050 | A1 | * | 11/2001 | Galletti .................... 241/260.1 |

FOREIGN PATENT DOCUMENTS

ES    2068142 A2  *  4/1995

* cited by examiner

Primary Examiner—Bena Miller
(74) Attorney, Agent, or Firm—Notaro & Michalos PC

(57) ABSTRACT

Double-bottom tank and mixing auger for chopping animal feed, of the type that is transported using a trailer or that are incorporated into a self-propelled vehicle. The said tanks are used to chop and mix animal fodder ingredients, preferably in agricultural installations. The invention is characterized in that it comprises an irregularly-shaped insert, close to the center of the tank, and in that two blades are disposed at 180° at the center of the mixing auger, thereby improving the operating torque and preventing any unnecessary accumulation of the product.

1 Claim, 3 Drawing Sheets

DOUBLE BOTTOM TANK AND MIXING AUGER FOR CHOPPING ANIMAL FEED

Figure 1:
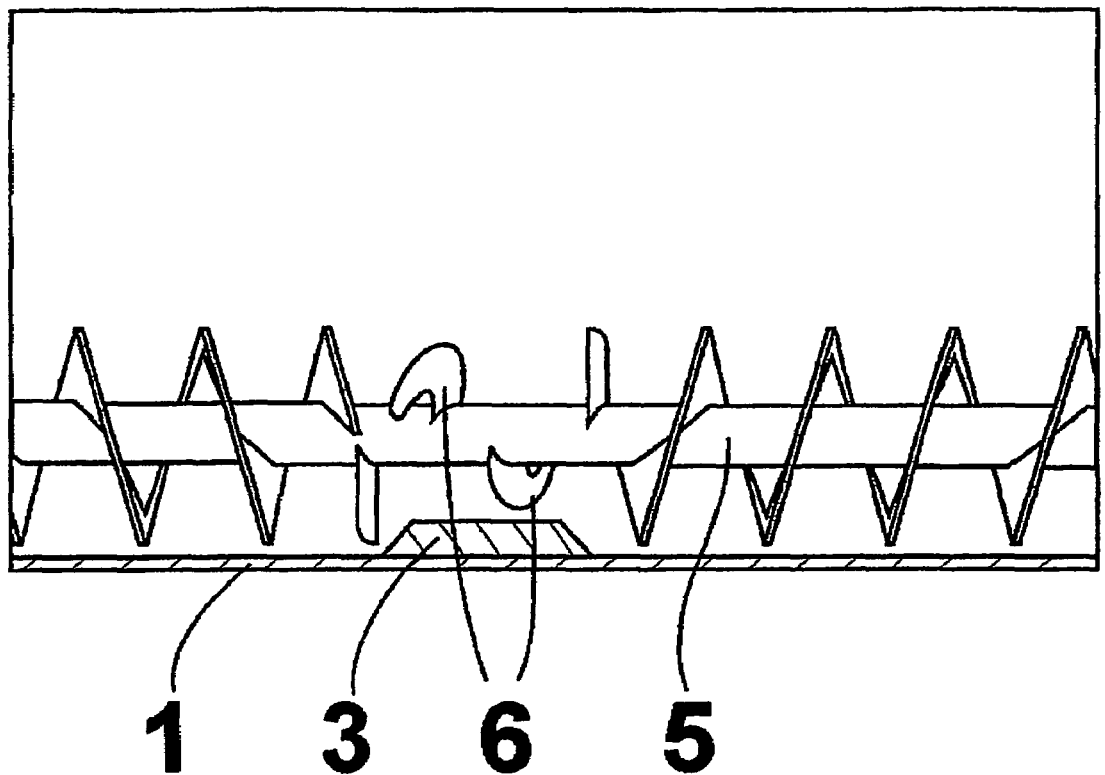

The present descriptive memory refers, as its title indicates, to a double-bottom tank and mixing auger for chopping animal feed, of the type that is transported using a trailer or that is incorporated into a self-propelled vehicle. Said tanks are used to chop and mix animal fodder ingredients, preferably in agricultural installations.

Currently, several types of tanks are used for animal feed chopping. Animal feed usually includes various types of forage, such as alfalfa, straw, vetch, etc. as well as different varieties of cereal flour. The animal feed is chopped inside the tank by one or more interacting cutting screws made up of spirals that converge towards the center of the screw, where sometimes there are several spiral blades that create a diameter noticeably narrower than that of the spirals.

As the Patent ES9301070 discloses, the tank generally used is a V shaped container with a rounded bottom, and usually the diameter of the bottom is wider than the diameter of the circle described by the spirals of the cutting roller when they rotate. Those tanks, currently used to chop animal feed, have the main disadvantage of accumulating the product in the center of the tank, i.e. between the external diameter of the central blades and the rounded bottom of the tank, which means the shafts of the chopping mechanisms, i.e. the chopping spiral screws, have to generate quite a high operating torque, and sometimes this strain can even buckle them.

To solve this problem affecting current animal feed chopping tanks, the double-bottom tank and mixing auger for chopping animal feed that is the subject of the present invention has been developed. Close to the center of the bottom there is an internal irregularly-shaped insert, preferably quadrangular and of variable thickness, depending on the actual requirements, which bends to adapt itself to the rounded bottom of the tank, in such a way that it rests partly on the bottom of the tank and partly on either side. This rounded part creates a double bottom. Naturally, the insertion of this part between the bottom of the tank and the external diameter created by the central chopping blades means that the accumulation of product is minimized, precisely at the most inconvenient point of the chopping screw, at its center. The mixing auger has been improved with two blades disposed at 180°, of laminar section and variable thickness, placed at the geometrical center of the auger shaft. These blades improve the mixing process of the product whilst it is turned over, helping the mixture to move forward and significantly reducing mixing times.

The invention being put forward brings one main advantage over the systems currently used to chop animal feed: as a consequence of the combined effect of the said elements, the operating torque is significantly improved, towards the center of the tank and, at the same time, overloads are prevented in that area, as there is no unnecessary accumulation of product. Obviously, the chopped product flows more easily, improving significantly the operating torque of the machine and increasing productivity.

To better understand the subject of the present invention, the preferred optimal assembly is represented in the annexed plan. In this plan:

FIG. 1—shows a side section of the central part of the double-bottom tank for chopping animal feed, with a detailed view of the position of the insert and of the mixing auger.

Figure 2:
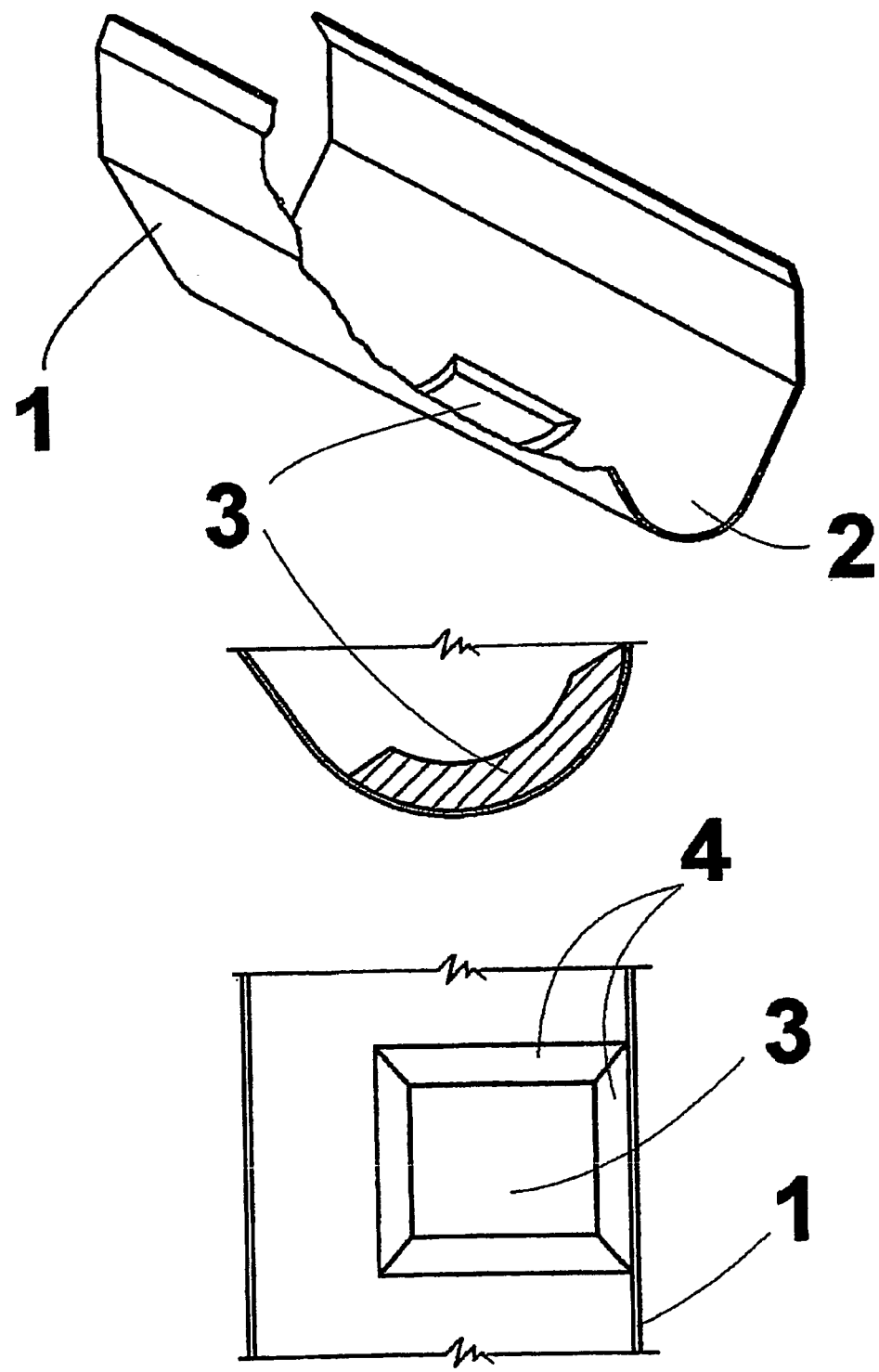

FIG. 2—shows the double-bottom tank for chopping animal feed in perspective, with a detailed top view of the bottom of the tank with its additional insert.

Figure 3:
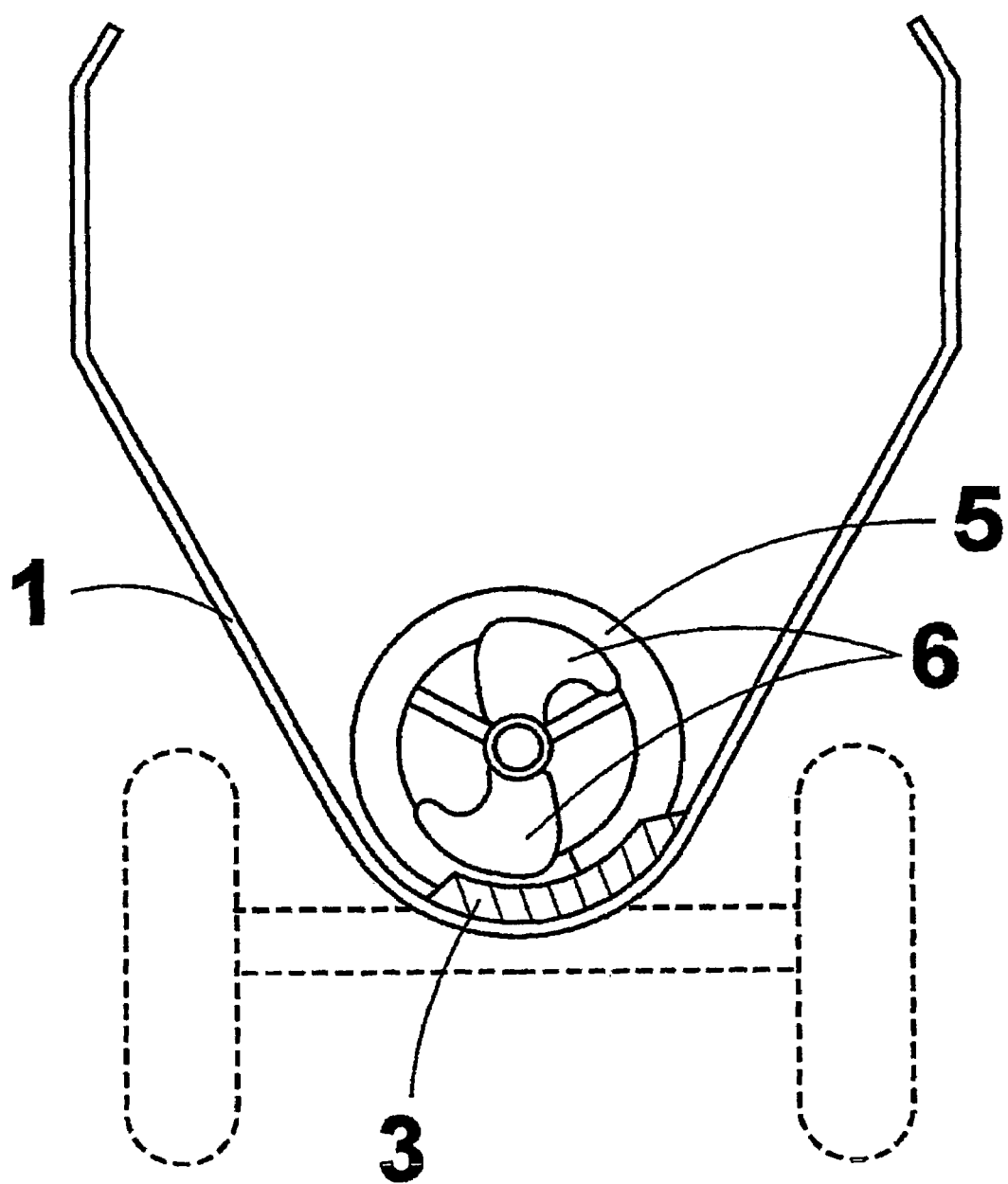

FIG. 3—shows a front section view where we can see the blades.

The double-bottom tank and mixing auger for chopping animal feed being put forward comprises, as can be seen from the figures mentioned above, a frame (1) made of any of several materials and laminar walls that has an insert (3) installed close to the center of its rounded bottom (2). This part creates a double bottom and two thirds of the part rest on either side of the tank.

The said insert (3) consists of an irregularly-shaped part, preferably quadrangular and of variable thickness that is not flat but curved and has a bevel edge (4) around its perimeter that starts at the base and ends at the top face. At the center of the shaft of the mixing auger (5) there are two blades (6) disposed at 180°.

A detailed description of the rest of the features of this tank and the chopping roller is deliberately omitted, as they are not considered to be the subject of any claim.

The invention claimed is:

1. Double-bottom tank and mixing auger for chopping animal feed for agricultural installations to prepare animal feed, comprising: a tank with a body (1) having a rounded bottom (2) and an insert (3) close to a center of the rounded bottom, the insert being curves, having a variable thickness and having a bevel edge (4) around a perimeter of the insert that starts at a base of the insert and ends at a top face of the insert and a mixing auger (5) which includes two blades disposed at 180° that have a laminar section and variable thickness, and are placed at a shaft's geometrical center; a reduced diameter of these blades improving the mixing process of the product whilst it is turned around, helping the mixture to move forward and significantly reducing mixing times and wherein the insert is inclined in such a way that two thirds of it rest against either side of the tank.

* * * * *